Feb. 3, 1970  L. E. GOVAERT  3,493,017
METHOD AND APPARATUS FOR WINDING FILAMENTS FOR ELECTRIC
INCANDESCENT LAMPS, DISCHARGE TUBES OR THE LIKE
Filed Jan. 26, 1967
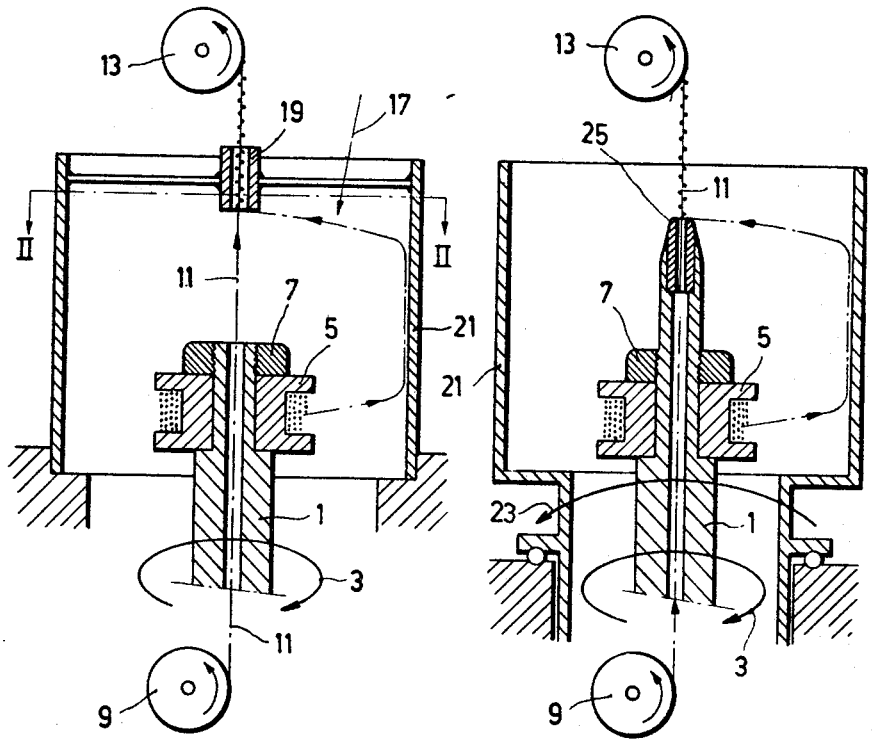
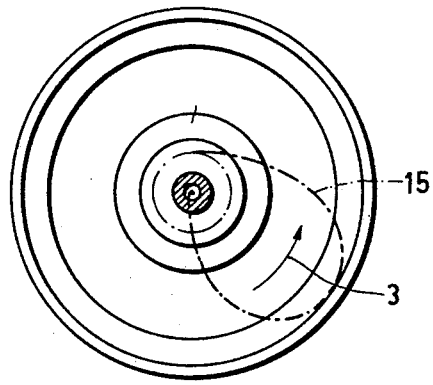
FIG.1  FIG.3
FIG.2
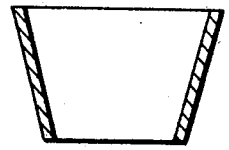
FIG.4
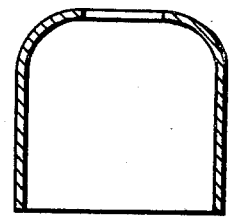
FIG. 5
INVENTOR.
LEONARDUS E. GOVAERT
BY
Frank R. Trifari
AGENT United States Patent Office 3,493,017
Patented Feb. 3, 1970

3,493,017
METHOD AND APPARATUS FOR WINDING FILAMENTS FOR ELECTRIC INCANDESCENT LAMPS, DISCHARGE TUBES OR THE LIKE
Leonardus Eduard Govaert, Venlo, Netherlands, assignor, by mesne assignments, to U.S. Philips Corporation, New York, N.Y., a corporation of Delaware
Filed Jan. 26, 1967, Ser. No. 612,041
Claims priority, application Netherlands, Jan. 27, 1966, 6601017
Int. Cl. B21f 45/00; H01j 9/02
U.S. Cl. 140—71.5                10 Claims

ABSTRACT OF THE DISCLOSURE

A method and apparatus for winding filament wire for use in devices such as incandescent lamps where a filament wire from a supply reel is wound helically on stay wire fed along the axis of the reel, the reel being rotated at a high speed whereby centrifugal force forms the portion of filament wire discharged from the reel into a loop extending to the stay wire and results in substantially constant tension in this wire as it is wound, and substantially uniform diameter of the windings. In an embodiment a sleeve is disposed concentrically about the reel and wound stay wire, whereby the loop is in friction contact with the inside wall of the sleeve.

---

The invention relates to a method of winding a filament for an electric incandescent lamp, a discharge tube or the like, in which a metal wire, referred to hereinafter as winding wire and consisting, for example, of tungsten is wound on a straight portion of a metal stay wire, for example, of molybdenum, displaced in longitudinal direction and temporarily serving as a core, the winding wire being wound off a rotating supply reel the axis of rotation of which coincides with the longitudinal axis of the relevant straight portion of the stay wire. Such a method is known.

In the known method, use is made of a stay wire temporarily serving as a core on which a winding wire is wound helically. After the stay wire has been wound, it is subjected to deforming and/or thermal treatment; the stay wire is then generally removed, for example, by an etching treatment. In this method, both the winding wire and the stay wire may be of composite nature; they may each consist of several wires of different material which may be twisted together.

In the known method of winding a filament, use is generally made of a winding unit which comprises a rotatably driven winding spindle taking the form of a support for the supply reel which is arranged concentrically and rotatably with respect to the winding spindle. The winding spindle has one or more guiding members generally having the form of guiding wheels. The winding wire is guided across the guiding wheels from the supply reel through the hollow winding spindle to the stay wire. Upon rotation of the winding spindle, the winding wire is wound around the stay wire, and the winding wire, which is guided by the guiding wheels, is drawn from the supply reel. The tension in the winding wire required for winding the stay wire is obtained by mechanically braking the rotary movement of the supply reel with respect to the winding spindle by a suitable device.

The known method has the disadvantage that tension fluctuations occur in the winding wire during the winding operation. This may result in the formation of a filament the winding wire of which, viewed throughout its length, exhibits variations in diameter. The thinner the winding wire is, the greater is this disadvantage. In a filament which is mounted in an electric incandescent lamp, a discharge tube or the like, such variations result in shortening of the life of the lamp or the tube.

Various factors are conductive to the occurrence of the said tension fluctuations in the winding wire. In order to permit the supply of the winding wire required for winding the stay wire from the supply reel, this reel must be arranged rotatably with respect to the rotating winding spindle and hence with a permissible minimum amount of bearing clearance. Moreover, this reel is in the unbalanced state with respect to its own axis of rotation. The influences of this clearance and this unbalanced state are found to give rise to considerable tension fluctuations in the winding wire already at a comparatively low speed of the winding spindle. Due to the presence of the guiding members for the winding wire, these tension fluctuations are intensified or other tension fluctuations may be introduced.

In order to limit the fluctuations of the wire tension, in the known method, comparatively low winding speeds are used; in the known method, a speed of the winding spindle of approximately 10,000 rev./min. may be used in practice.

The invention has for its object to provide measures by which a method is obtained which does not exhibit the said disadvantages.

As compared with the known method, the method in accordance with the invention is characterized in that the supply reel is driven at a speed such that a centrifugal force is exerted on the mass of the winding wire bulging in the form of a loop between the supply reel and the stay wire and moving around the stay wire, which centrifugal force produce in the part of the loop adjoining the stay wire the wire tension required for winding the stay wire. In this method, the braking force in the winding wire required for winding the stay wire can be supplied entirely by the centrifugal force. The length of winding wire required for winding the stay wire is obtained in that the loop formed by the winding wire, which in the absence of any guiding member secured to the winding spindle can perform a movement with respect to the supply reel, leads with respect to the supply reel. In this method, means for causing the supply reel to rotate with respect to the winding spindle, separate guiding members and a mechanism braking the winding wire, which are required in known arrangements, may entirely be dispensed with.

The wire tension required for winding the stay wire is determined in principle by the speed and the diameter of the loop formed by the winding wire. With a given diameter of the winding wire, it may be necessary that the speed required for winding should be chosen very high, for example, 25,000 rev./min. With this high speed, the winding speed may also be considerably higher than in the known method.

Although, under suitable conditions, the dimensions of the loop may be so constant that a reasonably constant tension is produced in the winding wire, in a further embodiment according to the invention, use is preferably made of a sleeve which concentrically surrounds the reel and the area at which the winding wire is wound on the stay wire and which limits the geometric form of the wire loop; thus, a greater freedom is obtained in choosing the said conditions. It is found that with the use of this sleeve tension fluctuations substantially do not occur in the winding wire. The value of the wire tension can be influenced by setting the sleeve also into rotation.

Such an arrangement for carrying out the method in accordance with the invention, which includes at least one winding unit with a rotatable supply reel for winding wire, means for transporting in longitudinal direction a stay wire to be wound along a straight path the direction of which coincides with the axis of rotation of the supply reel, and a guiding member for guiding the winding wire wound on the stay wire at a fixed area, is characterized in that the winding unit is provided with a spindle which is connected to driving means and on which the supply reel can be immovably secured.

The invention will now be described more fully with reference to the accompanying diagrammatic drawing, which shows a suitable arrangement for carrying out the method in accordance with the invention and in which:

FIGURE 1 is a sectional view of the axis of rotation of the arrangement,

FIGURE 2 is an elevation taken on the arrows II—II of FIGURE 1,

FIGURE 3 shows another embodiment of the arrangement of FIGURE 1 and

FIGURES 4 and 5 show alternative embodiments of sleeve for limiting the wire loop.

A central hollow spindle of the arrangement for winding a filament for an electric incandescent lamp, a discharge tube or the like is designated in FIGURES 1 and 2 by 1, which spindle is driven by suitable driving means at a speed of approximately 25,000 rev./min. in a direction indicated in the drawing, for example, with an arrow.

A supply reel 5 for a tungsten winding wire is fixedly secured on the spindle 1 by means of a nut 7.

The arrangement shown further includes a supply reel with a molybdenum stay wire 11. This stay wire 11 is wound in the direction of the arrow shown from the reel 9 and is wound slowly via the hollow spindle 1 on another reel 13. This stay wire 11 constitutes a core on which a winding wire originating from the supply reel 5 is helically wound. The box-shaped body 19 constitutes a guiding member for guiding the winding wire to the stay wire 11 at a fixed area.

The end of the winding wire is first connected to the stay wire. Subsequently, the supply reel is set into rotation so that due to centrifugal action the wire portion being between the reel 5 and the stay wire 11 is thrown outwards and bulges in the form of a loop 15 which moves around the wire 11 at a high speed. Due to the centrifugal force exerted on the mass of the loop 15, the braking force required for winding the stay wire 11 is applied in the portion of the loop indicated with an arrow 17.

It has been found that the winding tension produced in the relevant part 17 of the loop 15 may be kept very constant by the use of a sleeve 21 stabilizing the geometric form of the loop 15 and limiting it. In the embodiment shown, this sleeve is affixedly arranged. However, it may alternatively be arranged so as to be rotatable, for example in the direction of an arrow 23 (FIG. 3), as a result of which the value of the constant tension in the wire portion 17 may still be varied.

FIGURE 3 illustrates that the guiding member for guiding the winding wire to the stay wire at a fixed area may also be constituted by the end of the hollow spindle 1. For this purpose, the hollow spindle 1 is provided in this embodiment with a nose portion 25 guiding the winding wire.

With given diameters of the winding wire and the stay wire, the winding tension in the aforementioned wire portion 17 may be varied according to desire mainly by varying the speed of the supply reel 5 and/or the inner diameter of the sleeve 21.

Instead of a cylindrical sleeve 21, it is also possible to choose a different shape of the sleeve. The sleeve may have a conical or dome-shaped inner wall or its shape may be a combination of these two forms.

After the molybdenum stay wire 11 has been helically wound with tungsten winding wire, the wound stay wire is subjected to deforming and/or thermal treatments and finally divided into pieces. The stay wire is then removed, for example, by an etching treatment and the wound filament is left. All these treatments, which are generally known, are not further described here.

What is claimed is:

1. A method of winding a filament for a device such as an electric incandescent lamp and a discharge tube, including the steps of helicaly winding a first metal wire such as tungsten on a straight portion of a stay wire such as molybdenum which is moved in a longitudinal direction and temporarily serves as a core, the first wire being discharged off a rotating supply reel the axis of rotation of which coincides with the longitudinal axis of the relevant portion of the stay wire, comprising the steps:

(a) rotating the supply reel at a speed sufficient for urging by centrifugal force the discharge-portion of the first wire to form a loop extending from the reel to the stay wire,
   (b) winding this discharge-portion helically around the axially moving stay wire with the centrifugal force causing substantialy constant tension in the first wire thus resulting in substantially uniform windings of the filament.

2. A method as defined in claim 1 comprising the further steps:

(a) thermally treating the combination stay wire wound with first wire,
   (b) cutting the treated wire combination into sections, and
   (c) removing the stay wire from the windings by etching the stay wire.

3. A method as defined in claim 1 comprising the further steps of concentrically enclosing the annular space about the supply reel and the portion of stay wire being wound, with a sleeve separate from the reel for further reducing fluctuation in tension of the first wire by stabilizing the geometric form of the loop.

4. A method as defined in claim 3 comprising the further step of rotating the sleeve in a direction opposite that of the rotating supply reel.

5. A method as defined in claim 1 wherein said supply reel is rotated at a speed of about 25,000 revolutions per minute.

6. In an apparatus for winding a filament for use with a source of stay wire and a supply reel of filament wire, the improvement in a winding head in combination therewith, comprising:

(a) a rotatable spindle having a central bore with a discharge end,
   (b) means for securing said supply on the spindle,
   (c) means for feeding the stay wire from its source axially through said bore and out of said discharge end,
   (d) means for rotating said spindle and supply reel at a speed sufficient to (i) discharge and form the filament wire by centrifugal force into a loop extending under a substantially constant tension from the reel to the stay wire, and (ii) helically wind same onto said stay wire as the latter is fed axially, thereby forming wound wire, and
   (e) means for receiving said wound wire.

7. Apparatus as defined in claim 1 further comprising a round cylindrical sleeve fixedly disposed concentrically about the spindle and supply reel, the sleeve's inner walls forming a boundary for restraining and defining the maximum radial extension of said filament wire loop and aiding in stabilizing the tension thereof, when said centrifugal forces urges said loop to contact said walls.

8. Apparatus as defined in claim 7 wherein said sleeve is rotatable, the apparatus further comprising means for rotating said sleeve in a direction opposite that of the supply reel.

9. Apparatus as defined in claim 7, wherein said sleeve is fixedly mounted, and the apparatus further comprises a tubular guide means carried concentrically by said sleeve and disposed intermediate said discharge end and the means for receiving the wound wire, the guide means having inlet and outlet apertures through which the stay wire is fed with the windings being formed adjacent said inlet end.

10. Apparatus as defined in claim 8 wherein said discharge end of the bore is axially spaced from the supply reel on said spindle, the windings being formed on the stay wire adjacent said discharge end.

References Cited

UNITED STATES PATENTS

| 1,876,794 | 9/1932 | Traxel | 57—18 |
| 2,129,956 | 9/1938 | Pastor | 57—18 |
| 3,315,508 | 4/1967 | Mikina et al. | 140—71 |

LOWELL A. LARSON, Primary Examiner

U.S. Cl. X.R.

29—605; 57—18; 72—66